United States Patent
Hu et al.

(10) Patent No.: US 6,653,929 B1
(45) Date of Patent: Nov. 25, 2003

(54) METHOD OF DETERMINING NETWORK PATHS IN A THREE STAGE SWITCHING MATRIX

(75) Inventors: Jimmy Hu, Santa Rosa, CA (US); Robert Binh Nguyen, Plano, TX (US); Anthony Mazzurco, Plano, TX (US); James G. Gray, Carrollton, TX (US)

(73) Assignee: Alcatel USA Sourcing, L. P., Plano, TX (US)

( * ) Notice: Subject to any disclaimer, the term of this patent is extended or adjusted under 35 U.S.C. 154(b) by 0 days.

(21) Appl. No.: 09/527,413

(22) Filed: Mar. 17, 2000

Related U.S. Application Data

(60) Provisional application No. 60/173,178, filed on Dec. 27, 1999.

(51) Int. Cl.[7] .............................................. H03K 17/00
(52) U.S. Cl. ...................... 340/2.1; 340/2.2; 370/388; 370/390; 371/8.2; 371/11.1; 395/182.02; 455/555; 455/560
(58) Field of Search .......................... 340/2.1, 2.2, 2.21, 340/2.22, 2.24, 2.23; 370/388, 390; 379/271, 279; 371/8.2, 11.1; 395/182.02; 455/560, 555

(56) References Cited

U.S. PATENT DOCUMENTS

| | | | | |
|---|---|---|---|---|
| 4,400,627 A | * | 8/1983 | Zola | 307/115 |
| 5,032,837 A | * | 7/1991 | Yoshifuji | 340/825.8 |
| 5,276,425 A | * | 1/1994 | Swanson et al. | 340/826 |
| 5,451,936 A | * | 9/1995 | Yang et al. | 340/826 |
| 5,801,641 A | * | 9/1998 | Yang et al. | 340/826 |
| 6,226,684 B1 | * | 5/2001 | Sung et al. | 709/238 |
| 6,343,075 B1 | * | 1/2002 | Klausmeier et al. | 370/388 |
| 6,418,142 B1 | * | 7/2002 | Wolf | 370/390 |

* cited by examiner

*Primary Examiner*—Michael Horabik
*Assistant Examiner*—M Shimizo
(74) *Attorney, Agent, or Firm*—Baker Botts, LLP; Jessica W. Smith; V. Lawrence Sewell

(57) ABSTRACT

In a three stage non-blocking switching matrix (10), there are originating stages (12), center stages (14), and terminating stages (16). In order to establish matrix connections for either a one input/two output scenario or a two input/one output scenario, a determination must be made as to whether there is a center stage (12) common to all three ports. If so, then the matrix connection is established through the available center stage (12). If there is no common center stage (12) among the three ports, then rearrangement candidates are identified to free up an available center stage. One or more matrix connections are rearranged without affecting live traffic. After rearrangement, the matrix connection for the three ports is established through the freed up center stage (12).

12 Claims, 1 Drawing Sheet

METHOD OF DETERMINING NETWORK PATHS IN A THREE STAGE SWITCHING MATRIX

RELATED APPLICATIONS

This application claims the benefit of Provisional Application No. 60/173,178 filed Dec. 27, 1999.

TECHNICAL FIELD OF THE INVENTION

The present invention relates in general to telecommunications switching and more particularly to a method of determining network paths in a three stage switching matrix.

BACKGROUND OF THE INVENTION

To provide path protection, or path switching, for network paths, there needs to be an ability to broadcast one path onto two paths from one network element and to select from one of the two paths at another network element. In considering a general broadcast/select scenario, wherein broadcast is from one path to many paths and select is from many paths to one path, a number of broadcast/select paths will be limited for one network element that uses a non-blocking three stage Clos matrix. Therefore, it is desirable to identify a path among any available paths in the matrix in order to perform the broadcast/select path protection.

SUMMARY OF THE INVENTION

From the foregoing, it may be appreciated by those skilled in the art that a need has arisen for a technique to identify a path through a switching matrix in order to perform broadcast/select path protection. In accordance with the present invention, a method of determining network paths in a three stage switching matrix is provided that substantially eliminates or reduces disadvantages and problems associated with convention path protection techniques.

According to an embodiment of the present invention, there is provided a method of determining network paths in a three stage switching matrix that includes identifying center stages available to each of three parts associated with either an originating stage or a terminating stage. Center stages available to any two of the three ports and available to all three ports are also identified. Center stages available to any one of the three ports but not the other two are determined as well as center stages not available to any of the three ports. A matrix connection is established through any center stage available to all three ports. If no center stage is available, then rearrangement candidates are determined to rearrange another matrix connection in order to free up a common center stage for all three ports.

The present invention provides various technical advantages over conventional path protection techniques. For example, one technical advantage is to identify paths through a switching matrix to perform a broadcast of one input onto two outputs. Similarly, another technical advantage is to identify paths through a switching matrix to select one output from two inputs. Another technical advantage is to limit the number of center stage rearrangements required in a switching matrix to accommodate a broadcast or selection requirement. Other technical advantages may be readily apparent to those skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which.

DETAILED DESCRIPTION OF THE INVENTION

Figure 1:
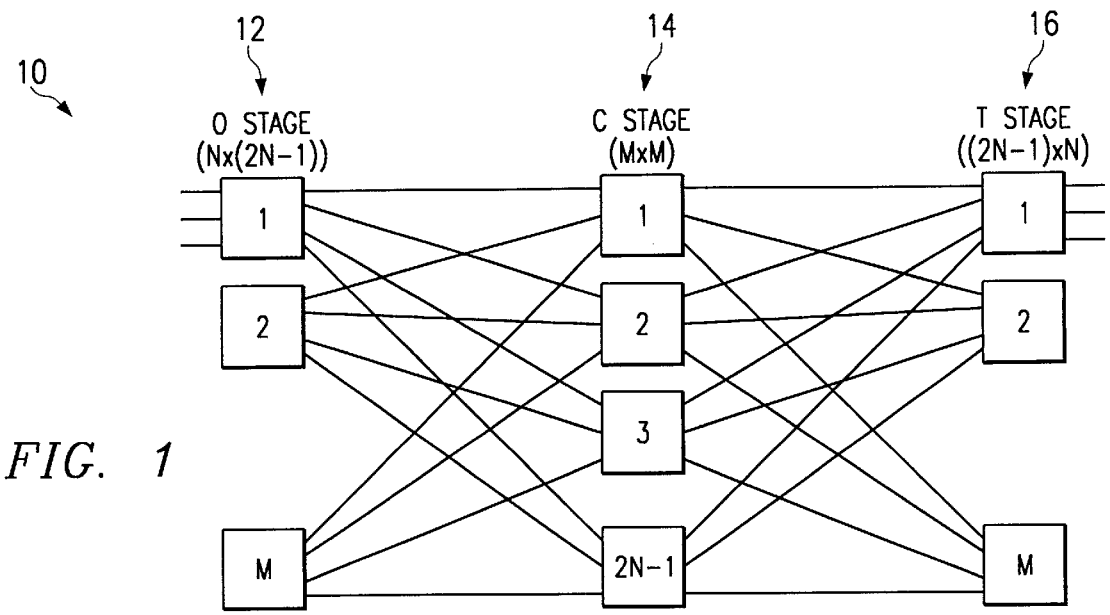
FIG. 1 illustrates a block diagram of a three stage non-blocking switching matrix.

FIG. 1 is a block diagram of a three stage non-blocking switching matrix 10. Switching matrix 10 includes a plurality of originating stages 12, a plurality of center stages 14, and a plurality of terminating stages 16. For the example of FIG. 1, there are M originating stages 12. Each of the M originating stages 12 has N inputs and 2N−1 outputs. Each of the 2N−1 outputs of an originating stage 12 couples to a corresponding one of 2N−1 center stages 14. Each of the 2N−1 center stages 14 has M inputs corresponding to each of the M originating stages 12. Each of the 2N−1 center stages 14 has M outputs. Each of the M outputs of a center stage 12 couples to a corresponding one of M terminating stages 16. Each of the M terminating stages 16 has 2N−1 inputs and N outputs. Thus, switching matrix 10 can cross-connect N×M paths.

Assuming all of the other inputs to an originating stage 12 are in use, for any input at originating stage 12 there are at least N center stages 14 available to pass the input through switching matrix 10, wherein N is determined by 2N−1−(N−1). Similarly, there are at least N center stages 14 available for any output at a terminating stage 16. Thus, for any path from an input at an originating stage 12 to an output of a terminating stage 16, there must be at least one center stage 14 available to both input and output, since N+N=2N which is greater than 2N−1. As a result, a strictly non-blocking switching matrix 10 for non-broadcast connections is provided.

Figure 2:
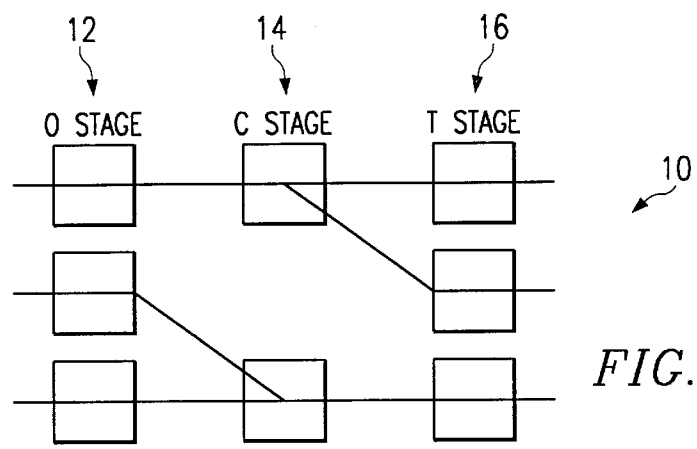
FIG. 2 illustrates broadcast and select scenarios for path protection.

FIG. 2 shows the broadcast and select scenarios for path protection. For both scenarios, three ports are involved. For the broadcast scenario, one input at an originating stage 12 is placed onto an outputs at each of two terminating stages 16 through a center stage 14. For the situation where the two outputs are at a single terminating stage 16, the broadcast will be performed by that terminating stage 16 instead of a center stage 14. For the select scenario, an input at each of two originating stages 12 are placed onto a single output of a terminating stage 16 by a center stage 14. For the situation where two inputs are at a single originating stage 12, the selection will be performed by that originating stage 12 instead of a center stage 14.

In the one-two or two-one path protection scenarios, there is no guarantee that a center stage 14 is available for the three ports involved. Thus, it is necessary to identify a commonly available center stage 14 for the three ports. Identification of a commonly available center stage 14 may result in rearrangement of other connections within switching matrix 10. The following describes a one-two path location, wherein the two-one path location is performed in a similar manner.

In finding a center stage 14 available to an input t1, an output t2, and an output t3, the following criteria is followed:

A(t1) is the set of all available center stages to an originating stage having t1 as an input.

A(t2) is the set of all available center stages to a terminating stage having t2 as an output.

A(t3) is the set of all available center stages to a terminating stage having t3 as an output.

I(t1,t2) is the set of all center stages available to both t1 and t2.

I(t1,t3) is the set of all center stages available to both t1 and t3.

I(t2,t3) is the set of all center stages available to both t2 and t3.

I(t1,t2,t3) is the set of all center stages available to all ports t1, t2, and t3.

I(t1,-t2,-t3) is the set of all center stages available to t1 but not available for t2 or t3.

I(-t1,t2,-t3) is the set of all center stages available to t2 but not available for t1 or t3.

I(-t1,-t2,t3) is the set of all center stages available to t3 but not available to t1 or t2.

I(-t1,-t2,-t3) is the set of all center stages not available to any of t1, t2, and t3.

In a three stage matrix having size M×(2N−1)×M, among any three different ports (input or output) with no common available center stage 14 for all three ports, then there are at least N+1 center stages 14 commonly available for any two of the three ports. For three stage non-blocking switching matrix 10, each of A(t1), A(t2), and A(t3) are equal to or greater than N. By three stage matrix property, each of I(t1,t2), I(t1,t3), and I(t2,t3) are equal to or greater than one. If I(t1,t2) is equal to K (where K is between 1 and N inclusive), then there are K center stages 14 belonging to both A(t1) and A(t2). The size of the union of A(t1) and A(t2) is at least N+N−K=2N−K. Since the total number of center stages 14 is 2N−1, then there are 2N−1−(2N−K)=K−1 center stages that do not belong to either A(t1) or A(t2). Since A(t3) is equal to or greater than N, there are at least N−(K−1) center stages 14 that are in A(t3) and also either in A(t1) or A(t2) Thus, the total number of center stages belonging to at least two of A(t1), A(t2), and A(t3) is (N−(K−1))+K=N+1. Therefore, if I(t1,t2,t3)=0 or is empty, then I(t1,t2)+I(t1,t3)+I(t2,t3) is equal to or greater than N+1.

As stated before, if outputs t2 and t3 are in the same terminating stage 16, then broadcast will be performed at that terminating stage 16. If the two outputs t2 and t3 are in different terminating stages 16, then the following process is performed. A center stage 14 is selected to provide the one-two path from I(t1,t2,t3), if any. If I(t1,t2,t3) is empty, there is no common center stage 14 for all three ports. Thus, it is impossible to locate a common center stage 14 without rearranging at least one other path. A search proceeds to find a path that is a qualified candidate for rearrangement in order to free up a center stage for t1, t2, and t3.

Every center stage 14 that is commonly available to two of the three ports is considered a rearrangement candidate of size one. For every pair of t1, t2, and t3 (thus I(t1,t2), I(t1,t3), and I(t2,t3)), there are more than two common center stages 14 available. A center stage 14 that is available to only one of the ports (such as I(t1,-t2,-t3) or I(-t1,t2,-t3) or I(-t1,-t2,t3)) is considered a rearrangement candidate of size two. For any center stage 14 in, for example, I(t1,-t2,-t3), it is only available for t1. Thus, two rearrangements, one for t2 and one for t3, are needed to free up a center stage 14 for all three ports. Such rearrangements are acceptable as they can be performed in parallel. A rearrangement candidate of size three is identified if three rearrangements can be performed for a center stage 14 that is not available to any of the ports, as in I(-t1,-t2,-t3), so as to free up the center stage 14 for all three ports. Each center stage 14 is verified to see if it could be available after one, two, or three rearrangements. Due to the degree of difficulty to rearrange matrix connections in switching matrix 10, rearrangement preferences may be given a priority. When a qualified candidate is identified, no further verifications are necessary.

Figure 3:
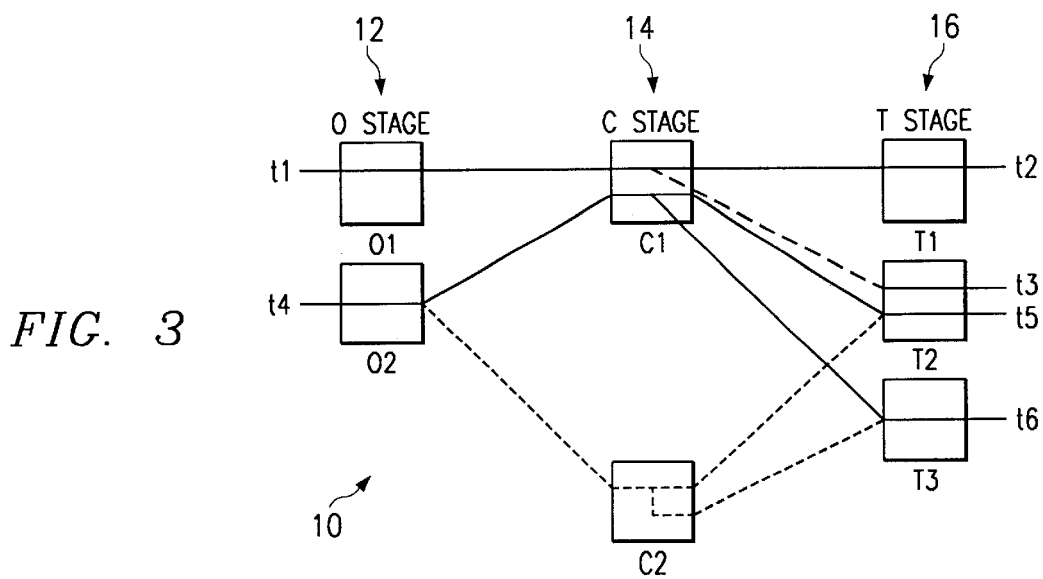
FIG. 3 illustrates an example of rearranging matrix connections to accommodate path protection.

FIG. 3 shows an example of a rearrangement process.

One matrix connection exists from originating stage O2 through center stage C1 to terminating stages T2 and T3, providing a one-two path for input t4 and outputs t5 and t6. It is desired to have a one-two path from input t1 to outputs t2 and t3. The set I(t1,t2,t3) is empty since there is no center stage 14 available to all three ports. This unavailability is due to terminating stage T2 having output t3 also having an output t5 using the center stage C1 belonging to the set I(t1,t2). Since there is no common center stage 14 available for ports t1, t2, and t3, center stage C1 and terminating stage T2 is considered a rearrangement candidate. The requisite rearrangements are performed without affecting live traffic.

The worst case scenario of output t5 belonging to a one-two path is shown. If the set I(t4,t5,t6) is not empty, then this one-two path can be rearranged through the common center stage 14, such as center stage C2. Rearranging one-two path t4 to t5 and t6 leaves center stage C1 available for the t1 to t2 and t3 one-two path. If the set I(t4,t5,t6) is empty, then this candidate is disqualified and another candidate will need to be located. If I(t1,t2) has size K, then there are K candidates. From the operation of a three stage non-blocking switching matrix, K is equal to or greater than two. If one of the K candidates involving t5 is a one to N path, then that candidate is disqualified. If another K candidate involving t5 is a one-one path, then there exists another center stage 14 that is available for the new rearrangement path. The existence of another center stage 14 turns this one of the K candidates into a qualified candidate.

The process described above may be equally applicable to a two-one path identification in a select scenario. If the two inputs are at the same originating stage 12, then that originating stage 12 performs the selection. If the two inputs are at separate originating stages 12, then the process described above is used to identify a center stage 14, either directly or through rearrangement, to set up the two-one path.

Thus, it is apparent that there has been provided, in accordance with the present invention, a method of determining network paths in a three stage switching matrix that satisfies the advantages set forth above. Although the present invention has been described in detail, it should be understood that various changes, substitutions, and alterations may be readily ascertainable by those skilled in the art and may be made herein without departing from the spirit and scope of the present invention as defined by the following claims.

What is claimed is:

1. A method for selecting a network path in a three stage switching matrix for a one-two or two-one connection, comprising the steps of;

for a plurality of center stages, determine a number of available ports in the center stage associated with appropriate first stage and third stage matrices needed to make the connection;

if three ports are available in one of the center stages to make the connection, make the connection through such center stage;

if three ports are not available in one of the center stages, analyze the center stages with two ports available to determine if a rearrangement of an existing connection can be made such that three ports would be available; and if such a rearrangement can be made of a center stage with two ports available, perform the rearrangement and make the connection through such center stage.

2. The method of claim 1, further comprising:

if a rearrangement can not be made in a center stage with two ports available, analyze the center stages with one port available to determine if a rearrangement of an existing connection can be made in a center stage such that three ports would be available; and if a rearrangement can be made in a center stage with one port available, perform the rearrangement and make the connection.

3. The method of claim 2, further comprising:

if a rearrangement can not be made in a center stage with one port available, analyze the center stages with no ports available to determine if a rearrangement of an existing connection can be made such that three ports would be available; and if a rearrangement can be made in a center stage with no port available, perform the rearrangement and make the connection.

4. The method of claim 3, further comprising:

if a rearrangement can not be made in any center stage to make three ports available, then deny the connection.

5. The method of claim 4, further comprising:

not allowing any rearrangement of an existing connection that is a 1 to N connection.

6. The method of claim 1, wherein ports of the center stage needed for the connection include one input port from a first stage and two output ports from one or more terminating stages.

7. The method of claim 1, wherein ports of the center stage needed for the connection include two input ports from one or more first stages and one output port from a terminating stage.

8. A method of selecting a center stage in a three stage matrix for making a one-two or two-one connection, comprising the steps of:

determining for one or more of the center stages how many ports would be available for the connection;

if a center stage has three ports available, selecting the center stage for the connection; and if no center stage has three ports available, selecting a center stage with the greatest number of available ports and with an existing connection that can be rearranged to make three ports available for the connection.

9. The method in claim 8, wherein the step of determining for one or more of the center stages how many ports would be available for the connection, comprises:

determining for one or more of the center stages if zero, one, two or three ports of the center stage are available for the connection.

10. The method in claim 9, wherein the step of selecting a center stage with the greatest number of available ports and with an existing connection that can be rearranged to make three ports available for the connection, comprises the step of:

eliminating for consideration a center stage if its ports would be available for a connection by rearranging more than three ports of a 1 to N connection.

11. The method in claim 10, wherein the step of selecting a center stage with the greatest number of available ports and with an existing connection that can be rearranged to make three ports available for the connection, firer comprises the steps of:

first analyze the center stages with two ports available to determine if a rearrangement of an existing connection can be made such that three ports would be available; and if such a rearrangement can be made of a center stage with two ports available, select such center stage for the connection;

if a rearrangement can not be made in a center stage with two ports available, then analyze the center stages with one port available to determine if a rearrangement of an existing connection can be made in a center stage such that three ports would be available; and if a rearrangement can be made in a center stage with one port available, select such center stage for the connection.

12. The method in claim 11, wherein the step of selecting a center stage with the greatest number of available ports and with an existing connection that can be rearranged to make three ports available for the connection, further comprises the steps of:

if a rearrangement can not be made in a center stage with one port available, analyze the center stages with no ports available to determine if a rearrangement of an existing connection can be made such that three ports would be available; and if a rearrangement can be made in a center stage with no port available, select such center stage for the connection.

\* \* \* \* \*